US006587453B1

(12) United States Patent
Romans et al.

(10) Patent No.: US 6,587,453 B1
(45) Date of Patent: Jul. 1, 2003

(54) METHOD OF COMMUNICATING FIRST AND SECOND DATA TYPES

(75) Inventors: Christopher Gwyn Romans, Clevedon (GB); Louis Mario Gaiot, Fort Collins, CO (US); Kevin James Negus, Hyattville, WY (US); Jean Tourrilhes, Bristol (GB); Paul John Morris, Cambridge (GB); Rajinder Gawera, Milton Keynes (GB)

(73) Assignees: Hewlett-Packard Company, Palo Alto, CA (US); Symbionics Limited, Cambridge (GB)

( * ) Notice: Subject to any disclaimer, the term of this patent is extended or adjusted under 35 U.S.C. 154(b) by 0 days.

(21) Appl. No.: 09/213,749

(22) Filed: Dec. 17, 1998

(30) Foreign Application Priority Data

Dec. 17, 1997 (EP) .............................. 97310247

(51) Int. Cl.[7] .............................................. H04B 7/212
(52) U.S. Cl. ...................................... 370/347; 370/478
(58) Field of Search ................................ 370/336, 337, 370/347, 442, 444, 445, 446, 447, 461, 478, 319, 321, 344, 338, 349, 350, 435, 436, 458; 375/135, 133; 455/8

(56) References Cited

U.S. PATENT DOCUMENTS

| | | | | |
|---|---|---|---|---|
| 5,123,029 A | | 6/1992 | Bantz et al. | |
| 5,329,531 A | * | 7/1994 | Diepstraten et al. | 370/347 |
| 5,384,777 A | * | 1/1995 | Ahmadi et al. | 370/337 |
| 5,862,452 A | * | 1/1999 | Cudak et al. | 455/321 |
| 5,892,769 A | * | 4/1999 | Lee | 370/447 |
| 5,953,344 A | * | 9/1999 | Dail et al. | 370/443 |
| 6,061,389 A | * | 5/2000 | Ishifuji et al. | 375/202 |
| 6,078,609 A | * | 6/2000 | Nago | 375/202 |
| 6,141,336 A | * | 10/2000 | Bauchot et al. | 370/348 |
| 6,275,517 B1 | * | 8/2001 | Izumi | 375/133 |
| 6,275,518 B1 | * | 8/2001 | Takahashi et al. | 375/135 |

* cited by examiner

*Primary Examiner*—Dang Ton
*Assistant Examiner*—Phuc Tran

(57) ABSTRACT

In a medium access control (MAC) protocol for a wireless communications network, communications between a control point and other nodes are coordinated by a repeated superframe. This superframe contains in sequence a contention-free period (CFP1), a contention-based period, and second contention-free period (CFP2). Prior to CFP1 a node hops from one channel frequency to another. CFP2 in a superframe is used for initial transmission of isochronous data (such as voice signals); CFP1 of the following superframe is used for retransmission of any such data which were not correctly received at the first attempt, after the frequency hop at the start of that following superframe. This arrangement minimises delay before retransmission of data, and improves the robustness of the system.

18 Claims, 4 Drawing Sheets

CPB - Control Point Beacon
Dn - Downlink Slot
Un - Uplink Slot
CFP1 - Contains 2 slots per connection for data that requires retransmission
CFP2 - Contains 2 slots per connection, one for downlink data and the other for uplink data

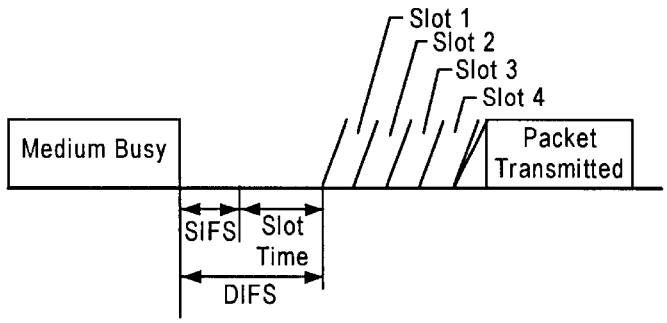

- Initial size of the Contention Window is 16.
- Sender selects a slot (backoff counter) and then decrements the counter whilst the medium is clear.
- Medium must be free for a DIFS period before the backoff counter is decremented.
- Example shows transmission of a packet in slot 5.

*Figure 5*

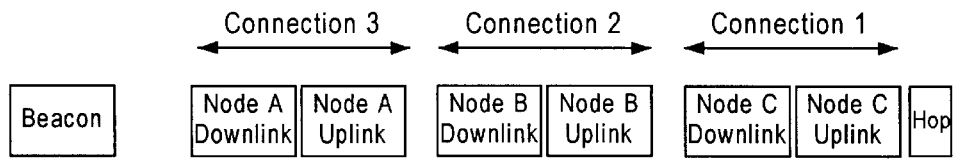

*The connection to Node C is closed*

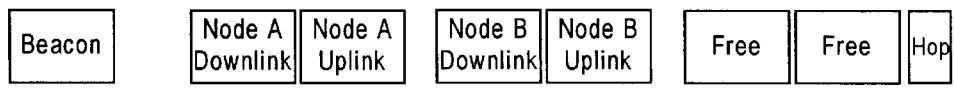

*Node A reallocated to Connection 1, Control Point transmits downlink data in Connections 1 & 3*
*Node A switches Connections and only transmits in Connection 1*

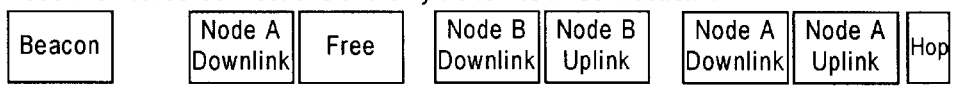

*Once the Control Point has received a transmission from Node A in the connection 1 uplink slot, Connection 3 is deleted*

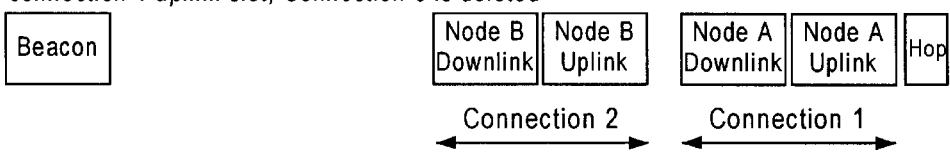

*Figure 6*

METHOD OF COMMUNICATING FIRST AND SECOND DATA TYPES

TECHNICAL FIELD

This invention relates to network communications.

DISCLOSURE OF INVENTION

According to one aspect of this invention there is provided a method of communicating data among a plurality of stations in a network, wherein:

first data are communicated during a period of a one kind in a communications cycle;

second data are communicated during a first period of another kind in said cycle, occurring before said period of one kind, and during a second period of the other kind in said cycle, occurring after said period of one kind;

a change in communications frequency is effected between a said second period in one cycle and a said first period in an immediately following cycle; and said first period in a cycle is used for retransmitting data which were not successfully transferred during said second period of an immediately preceding cycle.

In a specific embodiment, the invention concerns a Medium Access Control (MAC) protocol for a wireless network which can adapt to the type of traffic and support the delivery of both isochronous and asynchronous data.

BRIEF DESCRIPTION OF DRAWINGS

Methods and apparatus in accordance with this invention for communicating data in a wireless network will now be described, by way of example, with reference to the accompanying drawings, in which:

FIG. 5 illustrates transmission of a data packet in asynchronous contention-based operation of the network; and FIG. 6 illustrates steps involved in re-ordering of protocol connections between nodes.

BEST MODE FOR CARRYING OUT THE INVENTION, & INDUSTRIAL APPLICABILITY

This invention provides a medium access control (MAC) protocol which enables a wireless network to carry both isochronous (e.g voice) and asynchronous (data) traffic. Elements of the protocol include:

A "superframe" which is repeated periodically;

A contention-free service used to support the delivery of isochronous data;

A contention-based service used to support the delivery of asynchronous data;

A contention-free period at the end of the superframe in which isochronous data are transmitted. All data transmitted are acknowledged. If the data are not acknowledged they are repeated in a contention-free period at the start of the next superframe period.

In a Frequency Hopping system where the superframe equals the dwell period (the duration of operation at any one frequency, including the time taken to hop to that frequency), data are retransmitted on a different frequency providing frequency diversity and robustness. If there are no data to be retransmitted the duration of the contention-free period at the start of the superframe is zero.

The contention period occupies the time remaining between the two contention-free periods.

To support the isochronous data service a Beacon (CPB) is transmitted by a Control Point (CP) at the start of the superframe. The Beacon defines the duration of each of the three periods.

If no isochronous data are to be transmitted the contention period can occupy the whole superframe.

A Control Point is required to support the isochronous service. However a Control Point is not required for network operation; if no CP is present then the network supports the asynchronous data service only and operates as an ad-hoc network.

Network Topology

There can be four different station types in a network:

A Control Point which provides support for isochronous services.

An Isochronous Data Terminal or Voice Terminal. This only uses the time division multiple access (TDMA) mechanism in the contention-free period to communicate with a Control Point.

A Data Node. A data node only uses the carrier sense multiple access/collision avoidance (CSMA/CA) mechanism in the contention period and can communicate with a Control Point and other data nodes.

A Voice and Data Node. This can use both access mechanisms.

Figure 1:
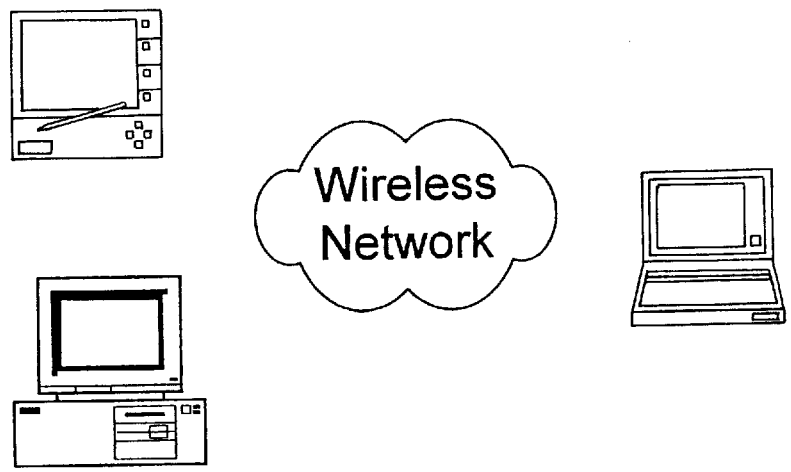
FIG. 1 shows a network operating in ad-hoc mode.
Figure 2:
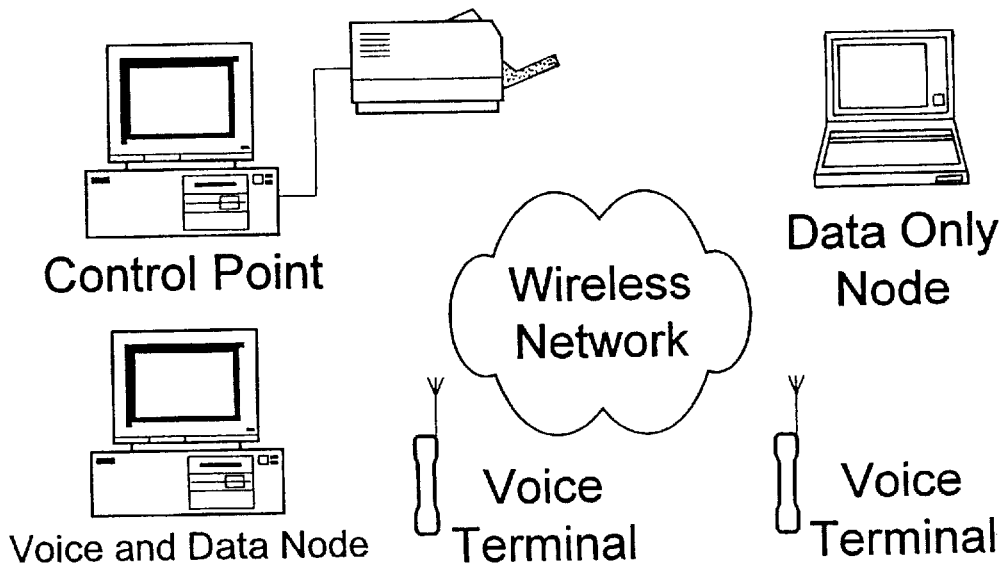
FIG. 2 shows a network operating in managed mode.
Figure 3:
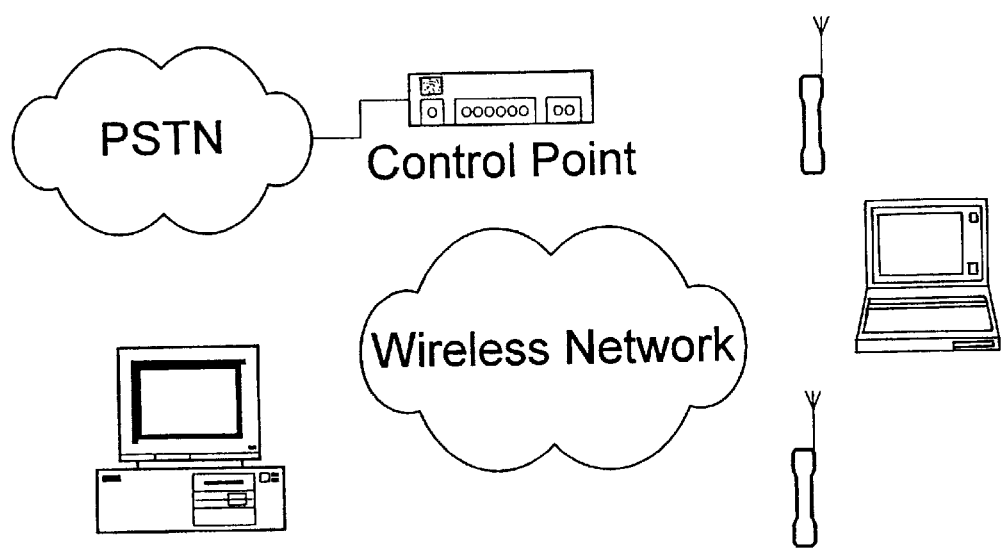
FIG. 3 shows a network operating in managed mode, with a connection to a public switched telephone network (PSTN)

The network can operate as either an ad-hoc network or as a managed network under the control of a Control Point. In an ad-hoc network all stations are equal (see FIG. 1) and control of the network is distributed between the stations. If a CP is present, as shown in FIG. 2, then the network is termed a managed network and can support isochronous voice services as well as asynchronous data services. The network may have a connection to external services, as shown in FIG. 3.

MAC Layer

The MAC is designed to provide two services:

An asynchronous contention-based (CSMA/CA) data service.

An isochronous contention-free (TDMA) voice service.

The MAC protocol is designed to operate in the presence of other RF systems and interference sources (e.g. microwave ovens) and therefore includes selective re-transmission of data.

Figure 4:
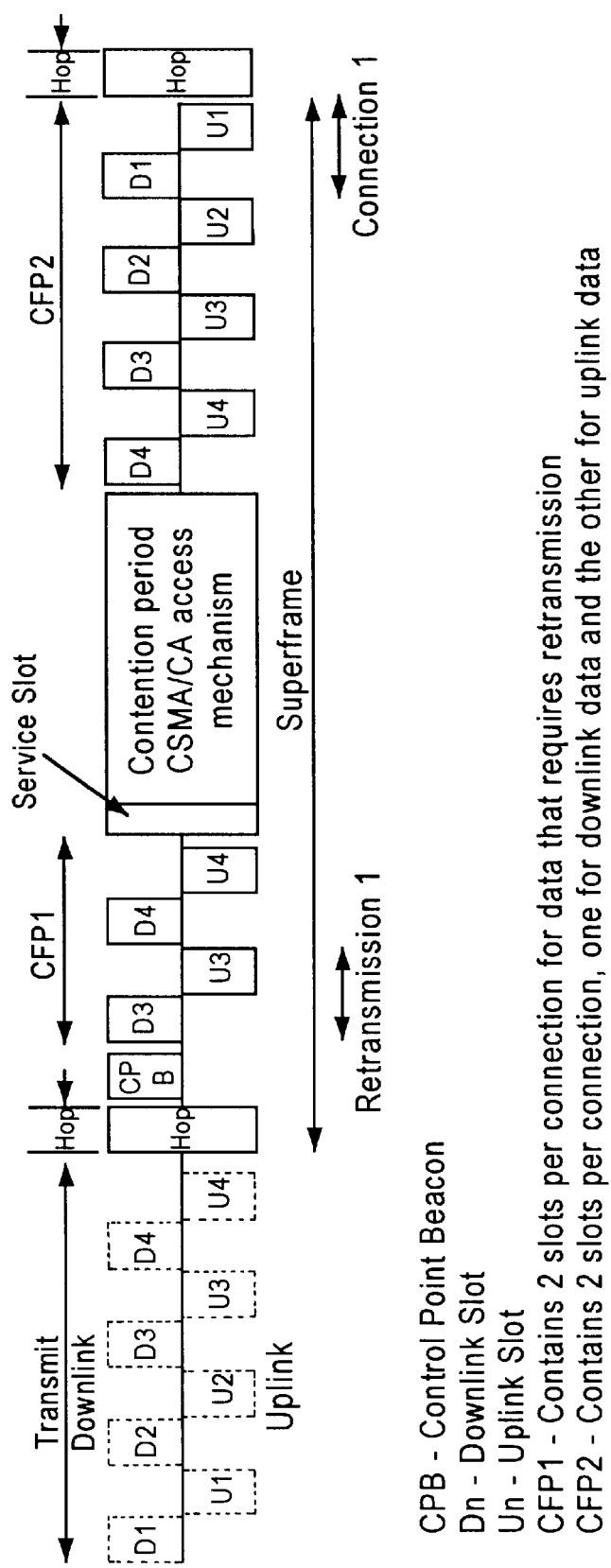
FIG. 4 shows the composition of a data frame in accordance with the invention.

The MAC protocol uses a superframe which incorporates two contention-free periods (CFP) and a contention period. The start of the superframe is the point at which a station begins to hop to a new channel and ends immediately before the station starts to hop to the next channel. The duration of the superframe is fixed and is the same as the dwell period. The access mechanism used during each CFP is TDMA, whilst the access mechanism used during the contention period is CSMA/CA. FIG. 4 shows the overall structure of the superframe.

The contention-free periods (CFP1 before the contention period and CFP2 after it) are only applicable in the case of a Managed Network. If no Control Point is present then the CSMA/CA contention period occupies the whole superframe and the network operates as an ad-hoc network.

Short Inter-Frame Space (SIFS) Period: This is the time required to switch between receive mode and transmit mode.

Default Inter-Frame Space (DIFS) Period: When the channel is free for a DIFS period it indicates that the previous packet exchange is complete and other nodes may contend for the channel.

Slot Time: The slot time is the time required for a node to sample the channel, determine its state and either prepare for transmission or hold off.

TDMA Access Mechanism

Access to the medium during the CFPs is managed by a Control Point using the Control Point Beacon (CPB). The CPB is transmitted at the start of each superframe and specifies the number of active TDMA connections (which dictates the length of CFP2) and whether any re-transmissions are required (which dictates the length of CFP1).

Each CFP is divided into a variable number of pairs of fixed length TDMA slots, one pair per TDMA connection. The first slot in each pair is used by the CP to transmit to a node (the downlink slot) and the second slot is used by the node to transmit to the CP (the uplink slot).

CFP1 starts immediately after the end of the Beacon. The duration of CFP1 is:

(Number of connections*2) * (SIFS+Duration of TDMA Voice Data message)

The start of CFP2 occurs one SIFS period before the first downlink transmission from the CP. The start of CFP2 is measured from the start of the Hop. Its duration is also:

(Number of connections*2) * (SIFS+Duration of TDMA Voice Data message)

The CFP at the end of the superframe (CFP2) is used for the initial transmission of TDMA data. The CFP at the beginning of the superframe (CFP1) is used for the retransmission of TDMA data which were not received correctly. The two CFPs are separated by a hop (giving frequency diversity), and since retransmission of a TDMA packet occurs soon after initial transmission, retransmission delays are minimised.

The service slot is used by a voice terminal to send management messages to a Control Point.

Voice data are transmitted in a TDMA uplink or downlink slot using the Voice Data message.

Acknowledgment and Re-transmission Procedure

If a Voice Terminal does not receive an expected Voice Data packet, or receives a Voice Data packet with an incorrect CRC, then it sets the TDMA Resend bit in the TDMA Control Field of the next Voice Data packet it transmits to the CP (transmitted immediately in the associated uplink slot).

During CFP2 if a CP:

1. does not receive an expected Voice Data packet;
2. receives a Voice Data packet with an incorrect Cyclic Redundancy Check (CRC) code; or
3. receives a Voice Data packet in which the TDMA Resend flag is set; then it will reserve a pair of slots in the re-transmission period (CFP1) for re-transmission of both the uplink and downlink data. In cases (1) and (2) the CP sets the TDMA Resend flag in the TDMA Control Field of the Voice Data packet re-transmitted to the Voice Terminal.

Only a single re-transmission of a Voice Data packet is supported. If the re-transmission of a packet fails then the failed packet is discarded.

It is possible for both the CP and TDMA terminal to receive duplicate messages during the re-transmission period; such duplicate messages are discarded.

Service Slot

To set up connections voice terminals need to communicate with a CP. In order to transmit the necessary management messages they use the service slot, which starts a SIFS period immediately after the CPB and any retransmission slots. Any message transmitted in the service slot will pre-empt any CSMA/CA transmissions. Responses to these management messages are contained within the CPB.

There is a reasonable probability that two TDMA terminals will attempt to transmit at the same time, or that a management message is not received correctly by the CP. In either of these cases the next CPB transmitted by the CP will not include any acknowledgment of the management message transmitted by the TDMA terminal. In this case the TDMA terminal retransmits the management message in a subsequent service slot after performing a random backoff. The TDMA terminal selects a backoff value between 1 and a predetermined maximum and after that number of dwell periods have elapsed retransmits the management message.

If a node supports both the TDMA and CSMA/CA services, it can also transmit management messages during the contention period.

Using a TDMA Slot for Management Messages

A node that has been allocated a connection by a Control Point can use the uplink TDMA slot for management messages. The management message is transmitted in place of a TDMA Data message.

Missed Control Point Beacons

If a node has been receiving CPBs and then does not receive a CPB in a dwell period it will use the slot allocation information in the last CPB it received for that dwell period.

If a node does not receive CPBs for a specified period then it will assume that it is itself no longer part of a managed network.

CSMA/CA Access Mechanism

A CSMA/CA access mechanism is used during the contention period of the superframe. FIG. 5 illustrates how the medium is accessed during the contention period. This mechanism is very similar to that defined in the IEEE 802.11 Wireless MAC and Physical Layer (PHY) specification.

The CSMA/CA access procedure is designed to provide fair access to the medium for all nodes by using a contention window and a backoff mechanism. Before any node transmits a packet it selects a backoff value and then starts listening. When the medium has been clear for a predefined Default Inter-frame Space (DIFS) period it decrements its backoff value for each elapsed free slot. When the backoff value reaches zero the node transmits the message. Whenever the medium is busy the countdown is suspended and only resumes when the medium has been free for a DIFS. This backoff mechanism reduces the probability of collision, and performing a backoff before transmission also ensures that responses from multiple nodes responding to a broadcast message on an otherwise idle network do not all collide.

Unicast data packets transmitted during the contention period are acknowledged by the recipient. If no acknowledgment is received they are re-transmitted.

If a retransmission is required because of a collision or transmission failure the size of the contention window is increased from an initial value (e.g. 16) exponentially up to a maximum value (e.g. 128) to avoid congestion.

Packet Format

The following diagram shows the layout of a MAC packet. Lengths are in octets.

| | 2 | 1 | 1 | (0 – MaxMSDULength + 6) | 4 |
|---|---|---|---|---|---|
| PHY Hdr | Frame Control | Dest Addr | Source Addr | Body (Payload) | CRC |

Frame Control

This is used to control the operation of the MAC protocol and includes, but is not limited to, the following fields:

Packet type;

TDMA acknowledgement/resend flag: Set, the TDMA packet was received correctly; Clear, no packet was received or a received packet failed the CRC check;

Sequence number: the sequence number distinguishes a received unicast DATA message from the previous unicast DATA message from the same sending node. MAC Protocol Data Unit (MPDU) retransmissions maintain the same sequence number as the initial transmission;

Retry flag: the retry bit will be set on all transmissions of a DATA packet which are not the first transmission of that packet.

Control Point Beacon Format
The format of the message payload is:

| Mandatory | Optional | Optional | Optional | Additional Optional Information |
|---|---|---|---|---|
| Control Frame 1 octet | Slot Assignment | Retransmission Information | Connection Management Information | |

Control Frame

Each bit in the control frame is used to indicate whether one of the optional parts is present in the Beacon.

TABLE 1

Control Point Beacon Control Frame

| Bit Position | Description |
|---|---|
| 0 | Set if the Slot Assignment part is present |
| 1 | Set if Retransmission Information part is present |
| 2 | Set if the Connection Management part is present |
| 3–7 | Available for additional optional information |

Slot Assignment

Slots are always assigned in pairs (connections), a downlink slot followed by an uplink slot. The Slot Assignment information is an implicit list of connections and the address of the node allocated to each connection. If a connection is not allocated the address is set to 00h.

| 8 bits | bits | 8 bits |
|---|---|---|
| Length in octets of the slot assignment information | Address for connection 1 | Address for connection N |

Connection 1 is the pair of slots next to the hop boundary.

Retransmission Information

Identifies the nodes which should prepare to receive a retransmission of the data transmitted by the Control Point in the previous dwell period, and also retransmit their own last data transmission to the Control Point. The Retransmission Information is an implicit list of connections and the address of the node allocated to each connection (see Slot Assignment).

Connection 1 is the pair of slots immediately following the CP Beacon.

Connection Management Information

The Connection Management information includes connection notifications and paging requests and consists of a series of 2-tuple fields as follows:

| | | Node 1 | | Node N | |
|---|---|---|---|---|---|
| 8 bits | 8 bits | 8 bits | 8 bits | 8 bits | |
| Length in octets of connection management information | Address | Event Field | Address | Event Field | |

Valid Event Flags include the following and can be logically OR'd to indicate multiple events.

| Bit Position | Description |
|---|---|
| 0 | Connection Request flag. |
| 1 | Connection Established flag |
| 2 | Connection Denied flag. |
| 3 | Terminate Connection Command. |
| 4–6 | Reserved, set to Zero |
| 7 | Paging Request flag |

Connection Request flag

Notifies a TDMA terminal that the Control Point has received a connection request to the node from another source, and has allocated a connection.

Connection Established flag

Notifies a TDMA terminal that the Control Point has received a connection request to the node and has allocated a connection.

Connection Denied flag

Notifies a TDMA terminal that the Control Point has received a connection request from the node and is unable to allocate a connection.

Terminate Connection Command

Notifies a TDMA terminal that the Control Point has terminated a connection and will reallocate the slots/connection.

Paging Request

Paging requests are used by the Control Point to determine if a node is present in the network. The addressed node responds to a paging request by sending a Control Point Service (CPS) Request message.

Control Point Operation
Periodic Transmissions

A CP transmits a CPB at the start of each and every dwell period.

TDMA Terminal Connection Request

A TDMA terminal requiring a TDMA connection to the Control Point will transmit a CPS Request message in the service slot. If there is a connection available the Control Point will allocate two slots to the node, one for downlink and the other for uplink.

The requesting node is notified by the CP of the success of its request by the CP's setting the Connection Established flag in the CPB. The slots/connection allocated to the node are also included in the Slot Assignment part of the CPB.

If there are no available slots, the CP will deny the connection request by setting the Connection Denied flag in the CPB. The requesting node may make another request at some later time.

If the Connection Established flag is not set in the CPB (and no slots are allocated), and the connection request is not denied then the TDMA terminal repeats the CPS Request message.

Control Point Connection Request

To establish a connection from a Control Point to a TDMA terminal the CP allocates slots for a connection and sets the Connection Request flag in the CP Beacon for the relevant TDMA terminal.

The node responds using a CPS Request message transmitted in the uplink slot allocated by the Control Point, each time it receives the connection request.

If the CP does not receive a CPS Request message from the node after a specified time the connection is deallocated.

Terminating a Connection

A TDMA terminal releases a connection by sending a CPS End message to the Control Point in its uplink slot. The message is repeated whilst CP Beacons are received by the node indicating that the connection is still active.

A CP terminates a connection by sending a Terminate Connection command in the CPB. The TDMA terminal must stop using the connection allocated to it on receipt of the Terminate Connection command and send a CPS End message to the Control Point in its uplink slot. On receipt of the CPS End message the CP will de-allocate the connection. The CPB will repeat the Terminate Connection command for a specified time or until it receives a CPS End message. If the CP has not received a response after a specified time it will de-allocate the slots.

If the CP does not receive any data from a TDMA terminal for a specified time then it will page the TDMA terminal using the paging facility in the CP Beacon. The node should immediately respond with a CPS Request message in its uplink slot or in the service slot if it wishes to keep its connection. If the Control Point does not receive a CPS Request message or any data from the node after sending a specified number of CP Beacons with the paging bit set it will assume that either the node is no longer in range or the CPS End message(s) sent by the node was never received, and that the connection should be cleared and the slots made available.

Connection Management

If a TDMA terminal that has been allocated a connection receives a CPB that does not include the node in the slot allocation list, then the node must stop using the slots it has been using and make a new connection request.

The Control Point can determine whether TDMA terminals are still active by setting a paging bit in the CPB. A TDMA terminal whose paging bit is set must respond with a CPS Request message.

If a node misses a specified number of consecutive scheduled CPB messages, it must assume that the current slot number assigned to it is invalid. The node must then stop using that slot and issue a new CPS Request message to get a new connection and slot number.

Re-ordering Connections

Once a connection is closed the slots being used for that connection can be reallocated to maximise the duration of the contention period. Only one pair of slots can be reallocated at any time.

To limit the number of nodes which have to move slots, the node allocated the earliest slots in the CFP is moved to the vacant slots. If it was the connection to this node that was closed then no reallocation of slots is required.

The Control Point notifies the node of its new slots using the Slot Assignment portion of the Beacon. On receipt of the Beacon the node starts using the new slot and will transmit uplink data in the new slot.

To ensure that no data are lost during the re-allocation process the Control Point does not de-allocate the old slots assigned to the repositioned node until it receives an uplink message from the node in the new slot. Until it receives this message it transmits downlink data in both the downlink slot of the old connection and the downlink slot of the new connection. Thus if the node does not receive the CPB containing the re-allocation command it can still receive data using its old slots. The slot re-allocation command is repeated until the Control Point receives an uplink message in the new slot.

FIG. 6 shows an example of the connection re-ordering process.

What is claimed is:

1. A method of communicating via communication frequencies first and second data types among plural stations of a network comprising communicating data of the first and second data types between the stations in a series of sequential frames on communication frequencies, each of the frames including sequential periods, each of the frames having a communication frequency, changing the communication frequency from a first frame in the series to the next frame in the series;

communicating the data of the first data type during one of the periods of each frame;

communicating the data of the second data type during another of the periods of each frame;

repeating the communication of the data of the second data type during an initial period of the next frame if the data of the second data type are not successfully communicated during the another period of the first frame.

2. The method of claim 1, wherein the data of the first data type are communicated during said periods used for contention-based communications.

3. The method of claim 1, wherein the data of the second data type are communicated during said periods used for contention-free communications.

4. The method of claim 3 wherein said second data type is isochronous.

5. The method of claim 1 wherein said first data type is asynchronous.

6. The method of claim 1 wherein the another periods are the final periods of the frames.

7. The method of claim 1 wherein the communications are performed wirelessly.

8. A method of transmitting via communication frequencies isochronous and asynchronous data among a plurality of stations in a network comprising:

transmitting the data in a series of frames, each of the frames having a communication frequency, changing the communication frequency for data transmission from one frame in the series to the next frame in the series;

during transmission or retransmission of isochronous data, forming at least some of the frames so they include at least a first period, a second period and a third period, the second period occurring after the first period and before the third period;

transmitting the asynchronous data in said second period;

transmitting the isochronous data in said third period; and retransmitting the isochronous data in the first period of the next frame in the series if the isochronous data are not successfully transmitted in the third period of said one frame.

9. The method of claim 8, further including using a contention-free access mechanism during the first and third periods of each frame.

10. The method of claim 8, further including using a contention access mechanism during the second period of each frame.

11. The method of claim 8, further including forming the frames so that there is no third period in frames that do not include isochronous data.

12. The method of claim 8 further including forming the frames so that if there is no isochronous data to retransmit in a frame there is no first period in that frame.

13. The method of claim 8 wherein isochronous data are considered not to be successfully transmitted if they are not-acknowledged by a recipient to whom the frame is transmitted.

14. The method of claim 8, wherein said frames are transmitted wirelessly.

15. A method of transmitting data among a plurality of stations in a network comprising:

transmitting data in a series of frames, each of the frames having a communication frequency, changing the communication frequency for data transmission from one frame in the series to the next frame in the series;

during transmission or retransmission of isochronous data, forming at least some of the frames so they include at least a first period, a second period and a third period, the second period occurring after the first period and before the third period;

transmitting asynchronous data in said second period according to a contention access mechanism;

transmitting the isochronous data in said third period according to a contention free access mechanism; and retransmitting, according to a contention free access mechanism, the isochronous data in the first period of said next frame in the series if the isochronous data are not successfully transmitted in the third period of said one frame.

16. Apparatus for transmitting via communication frequencies first and second data types to at least one other station of a network comprising a transmitter, a processor adapted to be responsive to data of the first and second data types for driving the transmitter, the processor being arranged for causing the transmitter to (a) transmit data of the first and second data types to the at least one other station in a series of sequential frames on communication frequencies, each of the frames including sequential periods, each of the frames having a communication frequency, (b) change the communication frequency from a first frame in the series to the next frame in the series, (c) transmit the data of the first data type during one of the periods of each frame, (d) transmit the data of the second data type during another of the periods of each frame, and (e) repeat the communication of the data of the second data type during an initial period of the next frame if the data of the second data type are not successfully communicated during the another period of the first frame.

17. Apparatus for transmitting via communication frequencies isochronous and asynchronous data to at least one other station in a network comprising:

a transmitter, a processor adapted to be responsive to data of the first and second data types for driving the transmitter, the processor being arranged for causing the transmitter to (a) transmit the data in a series of frames, each of the frames having a communication frequency, (b) change the communication frequency for data transmission from one frame in the series to the next frame in the series, (c) during transmission or retransmission of isochronous data, form at least some of the frames so they include at least a first period, a second period and a third period, the second period occurring after the first period and before the third period, (d) transmit the asynchronous data in said second period, (e) transmit the isochronous data in said third period, and (f) retransmit the isochronous data in the first period of the next frame in the series if the isochronous data are not successfully transmitted in the third period of said one frame.

18. Apparatus for transmitting data to at least one other station in a network comprising:

a transmitter, a processor adapted to be responsive to data of the first and second data types for driving the transmitter, the processor being arranged for causing the transmitter to (a) transmit data in a series of frames, each of the frames having a communication frequency, (b) change the communication frequency for data transmission from one frame in the series to the next frame in the series, (c) during transmission or retransmission of isochronous data, form at least some of the frames so they include at least a first period, a second period and a third period, the second period occurring after the first period and before the third period, (d) transmit asynchronous data in said second period according to a contention access mechanism, (e) transmit the isochronous data in said third period according to a contention free access mechanism, and (f) retransmit, according to a contention free access mechanism, the isochronous data in the first period of said next frame in the series if the isochronous data are not successfully transmitted in the third period of said one frame.

* * * * *